United States Patent
Hong et al.

(10) Patent No.: US 12,526,769 B2
(45) Date of Patent: Jan. 13, 2026

(54) REPORTING SIM CARD INFORMATION IN A NETWORK

(71) Applicant: BEIJING XIAOMI MOBILE SOFTWARE CO., LTD., Beijing (CN)

(72) Inventors: Wei Hong, Beijing (CN); Qianhong Huang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 354 days.

(21) Appl. No.: 18/250,126

(22) PCT Filed: Oct. 23, 2020

(86) PCT No.: PCT/CN2020/123412
§ 371 (c)(1),
(2) Date: Apr. 21, 2023

(87) PCT Pub. No.: WO2022/082777
PCT Pub. Date: Apr. 28, 2022

(65) Prior Publication Data
US 2023/0397164 A1    Dec. 7, 2023

(51) Int. Cl.
*H04W 68/02* (2009.01)

(52) U.S. Cl.
CPC .................. *H04W 68/02* (2013.01)

(58) Field of Classification Search
None
See application file for complete search history.

(56) References Cited

U.S. PATENT DOCUMENTS

| | | |
|---|---|---|
| 2013/0303203 A1 | 11/2013 | Wang et al. |
| 2014/0146667 A1 | 5/2014 | Zhang et al. |
| 2017/0150545 A1 | 5/2017 | Ramkumar et al. |
| 2020/0107293 A1 | 4/2020 | Cui et al. |
| 2022/0151013 A1* | 5/2022 | Chen ............... H04W 76/27 |
| 2022/0322286 A1* | 10/2022 | Han ............... H04W 68/10 |

(Continued)

FOREIGN PATENT DOCUMENTS

| | | | |
|---|---|---|---|
| CN | 1937839 A | | 3/2007 |
| CN | 101227635 A | | 7/2008 |
| CN | 111031533 A | * | 4/2020 ............ H04W 8/205 |

(Continued)

OTHER PUBLICATIONS

International Search Report Issued Jul. 21, 2021, in PCT/CN2020/123412, filed on Oct. 23, 2020, 4 pages.

(Continued)

*Primary Examiner* — Adolf Dsouza
(74) *Attorney, Agent, or Firm* — Oblon, McClelland, Maier & Neustadt, L.L.P.

(57) ABSTRACT

An information reporting method, comprises: reporting SIM card information corresponding to a plurality of SIM cards to a network side device; receiving a first paging message sent by the network side device, where the first paging message is a paging message for paging a first SIM card in an idle state from among the plurality of SIM cards; and in response to determining that the first paging message carries paging reason information, determining, according to the paging reason information, whether to perform paging response.

17 Claims, 10 Drawing Sheets

(56) References Cited

U.S. PATENT DOCUMENTS

2022/0394669 A1* 12/2022 Cai .................... H04W 68/02

FOREIGN PATENT DOCUMENTS

| CN | 111512657 A | 8/2020 |
| WO | WO 2007/107104 A1 | 9/2007 |
| WO | WO 2013/023342 A1 | 2/2013 |
| WO | WO 2018/005419 A1 | 1/2018 |
| WO | WO 2020/147839 A1 | 7/2020 |

OTHER PUBLICATIONS

Chinese Office Action issued Mar. 29, 2023, in Chinese Patent Application No. 202080002825.0, 8 pages.
Combined Chinese Office Action and Search Report issued Aug. 30, 2023 in Chinese Application 202080002825.0, 8 pages.

* cited by examiner

REPORTING SIM CARD INFORMATION IN A NETWORK

CROSS-REFERENCE TO RELATED APPLICATIONS

The application is a U.S. National Stage of International Application No. PCT/CN2020/123412 filed on Oct. 23, 2020, the entire content of which is incorporated herein by reference for all purposes.

TECHNICAL FIELD

The present disclosure relates to the field of communications, and in particular, to an information reporting method and apparatus, and a storage medium.

BACKGROUND

With the development of wireless communication technology, there are more and more multi-card terminals. Taking a dual-card terminal as an example, a business user has a private Subscriber Identity Module (SIM) card and a business SIM card, and the two SIM cards are placed on the same terminal, or the user has two private SIM cards, and may choose which SIM card to use according to the service.

The pluralities of SIM cards included in the multi-card terminal may be from the same operator or from different operators. At present, the processing methods for multi-card terminals are mainly based on the implementations of various terminal manufacturers, and there is no unified standard for regulations.

SUMMARY

The embodiments of the present disclosure provide an information reporting method and apparatus, and a storage medium.

According to a first aspect of the embodiments of the present disclosure, there is provided an information reporting method, the method is applied to a multi-card terminal, and includes:
reporting SIM card information corresponding to pluralities of SIM cards to a network-side device;
receiving a first paging message sent by the network-side device; where the first paging message is a paging message for paging a first SIM card in an idle state among the pluralities of SIM cards; and
in response to determining that the first paging message carries paging cause information, determining whether to perform a paging response according to the paging cause information.

According to a second aspect of the embodiments of the present disclosure, there is provided an information reporting method, the method is applied to a network-side device, and includes:
receiving SIM card information corresponding to pluralities of SIM cards reported by a multi-card terminal; and
in response to a need to page a first SIM card in an idle state among the pluralities of SIM cards, after determining that paging cause information needs to be added to a first paging message for paging the first SIM card according to the SIM card information corresponding to the pluralities of SIM cards, sending the first paging message carrying the paging cause information.

According to a third aspect of the embodiments of the present disclosure, there is provided an information reporting apparatus, the apparatus is applied to a multi-card terminal, and includes:
a reporting module, configured to report SIM card information corresponding to pluralities of SIM cards to a network-side device;
a first receiving module, configured to receive a first paging message sent by the network-side device; wherein the first paging message is a paging message for paging a first SIM card in an idle state among the pluralities of SIM cards; and
a determining module, configured to, in response to determining that the first paging message carries paging cause information, determine whether to perform a paging response according to the paging cause information.

According to a fourth aspect of the embodiments of the present disclosure, there is provided an information reporting apparatus, the apparatus is applied to a network-side device, and includes:
a second receiving module, configured to receive SIM card information corresponding to pluralities of SIM cards reported by a multi-card terminal; and
a sending module, configured to, in response to a need of paging a first SIM card in an idle state among the pluralities of SIM cards, after determining that paging cause information needs to be added to the first paging message for paging the first SIM card according to the SIM card information corresponding to the pluralities of SIM cards, send the first paging message carrying the paging cause information.

According to a fifth aspect of the embodiments of the present disclosure, there is provided a computer-readable storage medium, where the storage medium stores a computer program, and the computer program is configured to execute the information reporting method according to any item of the above-mentioned first aspect.

According to a sixth aspect of the embodiments of the present disclosure, there is provided a computer-readable storage medium, where the storage medium stores a computer program, and the computer program is configured to execute the information reporting method according to any item of the above-mentioned second aspects.

According to a seventh aspect of the embodiments of the present disclosure, there is provided an information reporting apparatus, including:
a processor; and
a memory for storing instructions executable by the processor;
where the processor is configured to execute the information reporting method according to any item of the above-mentioned first aspect.

According to an eighth aspect of the embodiments of the present disclosure, there is provided an information reporting apparatus, including:
a processor; and
a memory for storing instructions executable by the processor;
where the processor is configured to execute the information reporting method according to any item of the above-mentioned second aspect.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and together with the description serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used in the present disclosure are for the purpose of describing particular embodiments only and are not intended to limit the present disclosure. As used in the present disclosure and the appended claims, the singular forms "a/an", "said" and "the" are intended to include the plural forms as well, unless the context clearly dictates otherwise. It should also be understood that the term "and/or" as used herein refers to and includes any and all possible combinations of one or more of the associated listed items.

It should be understood that although the terms first, second, third, etc. may be used in the present disclosure to describe various pieces of information, such information should not be limited by these terms. These terms are only used to distinguish the same type of information from each other. For example, the first information may also be referred to as second information, and similarly, the second information may also be referred to as the first information, without departing from the scope of the present disclosure.

Depending on the context, the word "if" as used herein can be interpreted as "at the time of" or "when" or "in response to determining".

The following first introduces the information reporting solution provided by the present disclosure from the multi-card terminal side. The multi-card terminal is a terminal that supports the installation of two or more Subscriber Identity Module (SIM) cards.

Figure 1:
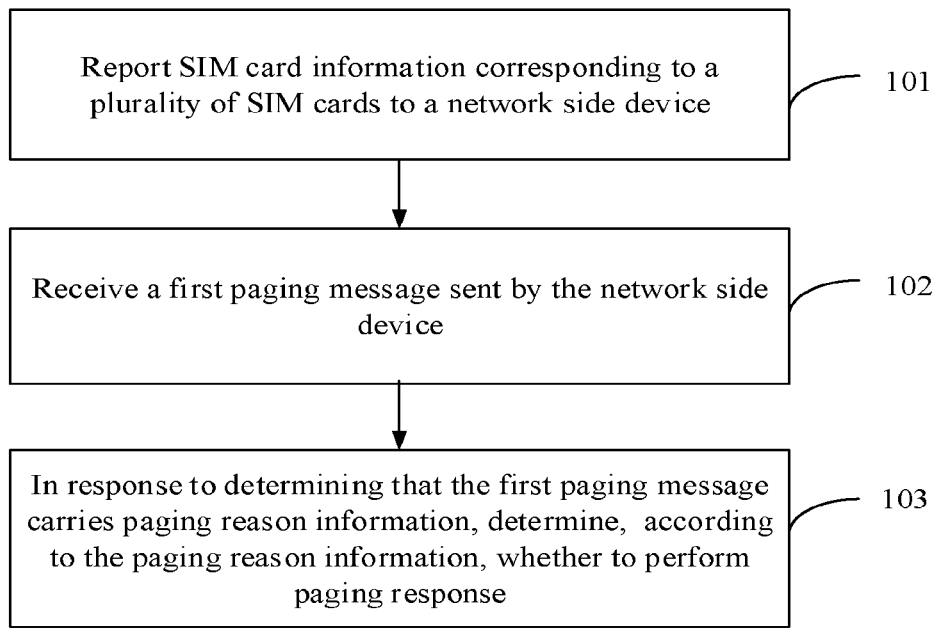
FIG. 1 is a schematic flowchart of an information reporting method according to an exemplary embodiment.

An embodiment of the present disclosure provides an information reporting method. FIG. 1 is a flowchart of an information reporting method according to an embodiment, which may be applied to the multi-card terminal. The method may include the following steps.

In step 101, SIM card information corresponding to pluralities of SIM cards is reported to a network-side device.

In the embodiments of the present disclosure, the SIM card information corresponding to the pluralities of SIM cards may include, but is not limited to, at least one of: the number of the pluralities of SIM cards, identification information of each SIM card among the pluralities of SIM cards, whether each SIM card is in a turn-on state. The identification information of each SIM card may include, but is not limited to, actual identification information and/or temporary identification information of each SIM card.

In the embodiments of the present disclosure, the network-side device may be a network-side device accessed by any one of the pluralities of SIM cards, or may be a network-side device accessed by all the SIM cards in the pluralities of SIM cards. The network-side device includes, but is not limited to, a base station and/or a core network.

In step 102, a first paging message sent by the network-side device is received.

In the embodiments of the present disclosure, the first paging message is a paging message for paging a first SIM card. The first SIM card is a SIM card in an idle state among the pluralities of SIM cards.

In step 103, in response to determining that the first paging message carries paging cause information, it is determined whether to perform a paging response according to the paging cause information.

In the embodiments of the present disclosure, the paging cause information is used for indicating a reason for paging the first SIM card this time, including but not limited to the arrival of the telephone service, the arrival of the SMS service, the arrival of the voice call and/or the video call service, the arrival of a system push message, and so on. The network-side device may add an information field for indicating the paging cause information in the first paging message, so as to inform the terminal side of the specific paging cause.

For the multi-card terminal, it may be determined whether to perform a paging response according to the paging cause indicated by the paging cause information.

In one example, whether to perform a paging response may be determined according to a service type and/or a priority level in the paging cause. For example, if the service type is a telephone service, it is determined that a paging response is required, or if the service priority is greater than or equal to a preset priority, then it can be determined that a paging response is required.

In the above embodiment, the multi-card terminal may report the SIM card information of pluralities of SIM cards to the network-side device, and after receiving the first paging message sent by the network-side device, determine whether to make a paging response according to the paging cause information carried in the first paging message. In the present disclosure, the multi-card terminal may report the SIM card information of pluralities of SIM cards, so that the network-side device may add paging cause information in the paging message. Further, the multi-card terminal may determine whether to perform a paging response according to the paging cause information in the paging message, so as to avoid affecting the service of the connected SIM card, and have high availability.

In an optional embodiment, the above-mentioned step 101 may include, but is not limited to, the following situations.

The first situation is to report the SIM card information corresponding to the pluralities of SIM cards to the network-side device to which the SIM card is connected through any one of the pluralities of SIM cards.

In the embodiments of the present disclosure, the multi-card terminal may select any SIM card from the pluralities of SIM cards, and report the SIM card information to the network-side device connected to the SIM card through this SIM card. The network-side device may include, but is not limited to, a base station and/or a core network.

The second situation is to report the SIM card information corresponding to the pluralities of SIM cards to the corresponding network-side device through each SIM card of the pluralities of SIM cards.

In the embodiments of the present disclosure, the multi-card terminal may report the SIM card information to the network-side devices connected to individual SIM cards through all SIM cards in the pluralities of SIM cards. The network-side device may include, but is not limited to, a base station and/or a core network.

Optionally, when the multi-card terminal reports the SIM card information, the SIM card information corresponding to the pluralities of SIM cards may be reported to the network-side device through a first information unit in a first signaling. Optionally, the first signaling may be a Radio Resource Control (RRC) signaling, including but not limited to UEAssistanceInformation (terminal assistance information) signaling. The first information unit includes, but is not limited to, MUSIMInformation (multi-SIM card information) information unit in the UEAssistanceInformation signaling.

In the above embodiment, the multi-card terminal may select one SIM card to report the SIM card information, or select pluralities of SIM cards to report the SIM card information, which is simple to implement and has high usability.

Figure 2:
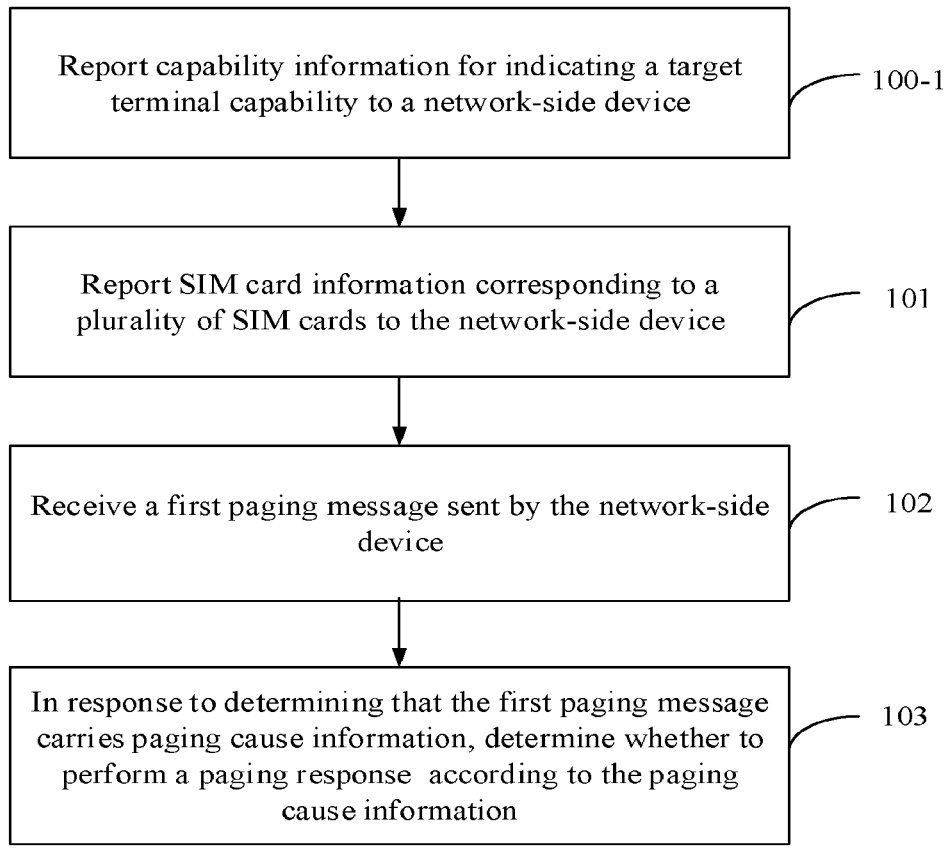
FIG. 2 is a schematic flowchart of another information reporting method according to an exemplary embodiment.

In an optional embodiment, referring to FIG. 2, which is a flowchart of another information reporting method according to the embodiment shown in FIG. 1, before performing step 101, the method may further include the following steps.

In step 100-1, capability information for indicating a target terminal capability is reported to the network-side device.

The target terminal capability is used for indicating whether the multi-card terminal supports a capability of reporting the SIM card information corresponding to the pluralities of SIM cards.

Optionally, the multi-card terminal may report the capability information for indicating the target terminal capability to the network-side device through a second information unit of a second signaling. The second signaling may include, but is not limited to, an RRC signaling.

If the multi-card terminal and the network-side device communicate through the 4G network, the second signaling may include but not limited to UE-EUTRA-Capability (Terminal Evolved UMTS Terrestrial Radio Access capability) signaling, and the second information unit may include but not limited to OtherParameters (other parameters) information unit in the UE-EUTRA-Capability signaling.

If the multi-card terminal and the network-side device communicate through the 5G network, the second signaling may include but not limited to UE-NR-Capability (terminal New Radio capability) signaling, and the second information unit may include but not limited to OtherParameters (other parameters) information unit in the UE-NR-Capability signaling.

In the above embodiment, the multi-card terminal may report in advance whether it supports the capability to report the SIM card information of pluralities of SIM cards to the network-side device, so that the network-side device may configure the target configuration information when reporting the SIM card information, which has high availability.

Figure 3:
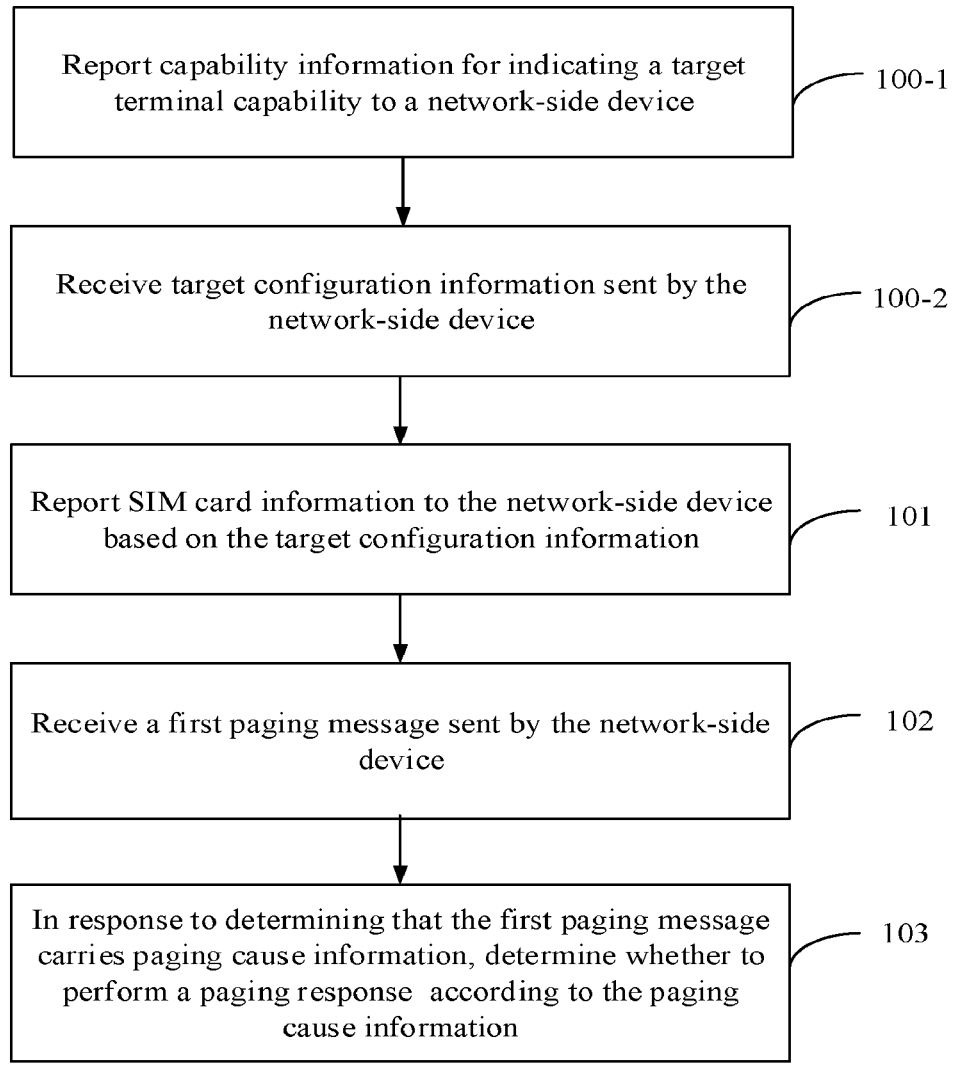
FIG. 3 is a schematic flowchart of another information reporting method according to an exemplary embodiment.

In an optional embodiment, referring to FIG. 3, which is a flowchart of another information reporting method according to the embodiment shown in FIG. 2, the method may further include the following steps.

In step 100-2, the target configuration information sent by the network-side device is received.

In the embodiments of the present disclosure, the target configuration information is used for indicating the configuration information when the multi-card terminal reports the SIM card information corresponding to the pluralities of SIM cards. Optionally, the target configuration information includes, but is not limited to, at least one of: whether to allow the multi-card terminal to report the SIM card information corresponding to the pluralities of SIM cards; a SIM card identifier that allows reporting the SIM card information corresponding to the pluralities of SIM cards; a period duration for reporting the SIM card information corresponding to the pluralities of SIM cards; a reporting condition for reporting the SIM card information corresponding to the pluralities of SIM cards; a content of the reported SIM card information corresponding to the pluralities of SIM cards; a reporting format when reporting the SIM card information corresponding to the pluralities of SIM cards.

Correspondingly, step 101 may include: based on the target configuration information, reporting the SIM card information corresponding to the pluralities of SIM cards to the network-side device.

In an example, after the multi-card terminal determines, based on the target configuration information, that reporting of the SIM card information is allowed, the multi-card terminal may report the SIM card information to the network-side device.

In another example, the multi-card terminal needs to report the SIM card information to the network-side device through a target SIM card corresponding to the SIM card identifier.

In another example, the multi-card terminal may set a blocking timer whose duration is equal to the period duration included in the target configuration information. Each time the multi-card terminal reports the SIM card information, the blocking timer is started, and the SIM card information may be reported again after the timer expires.

In another example, the reporting condition includes, but is not limited to, a SIM card state condition when the SIM card is reporting, for example, the SIM card needs to report SIM card information of pluralities of SIM cards when the SIM card is in a turn-on state, or a certain SIM card can report SIM card information only when it is in a turn-off state, or a certain SIM card can report SIM card information in any state, which is not limited in the present disclosure.

In another example, the content of the reported SIM card information corresponding to the pluralities of SIM cards includes, but is not limited to, the number of the pluralities of SIM cards, the identification information of each SIM card in the pluralities of SIM cards, whether each SIM card is in a turn-on state.

In another example, the reporting format includes, but is not limited to, a reporting sequence of the content of the reported SIM card information corresponding to the pluralities of SIM cards, for example, a certain content is reported first, and then other contents are reported.

In the above embodiment, the multi-card terminal may report the SIM card information to the network-side device based on the target configuration information configured by the network-side device, so that the network-side device can determine whether to add paging cause information to the paging message, which has high availability.

Figure 4:
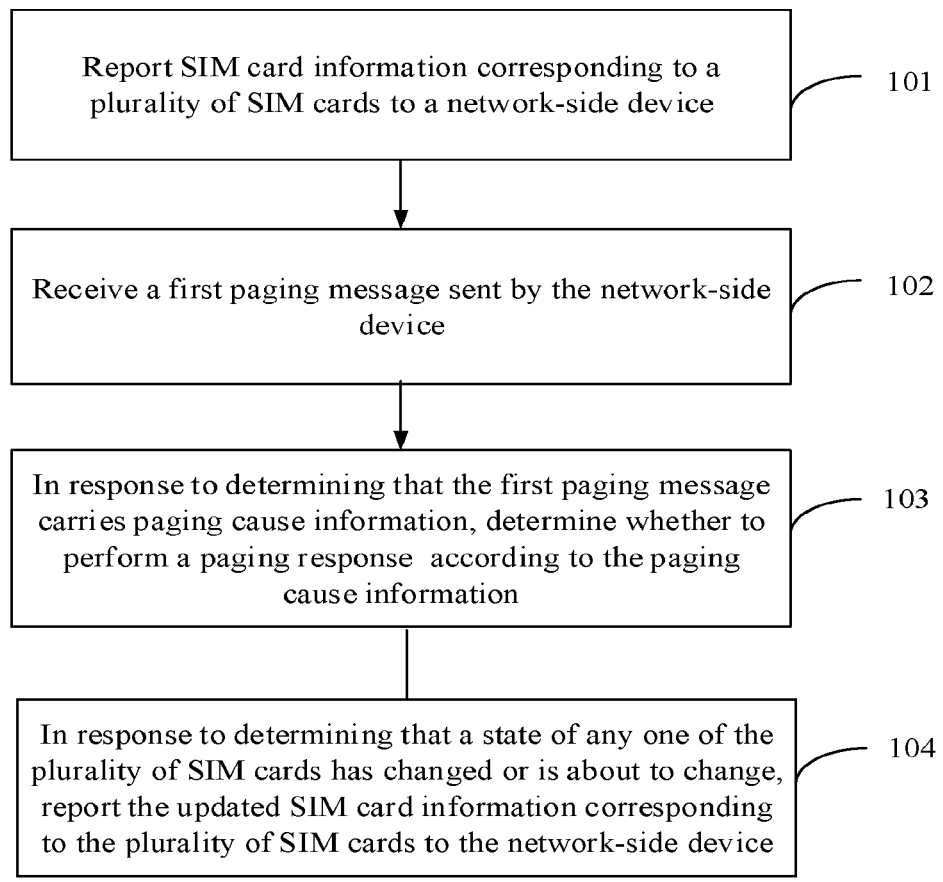
FIG. 4 is a schematic flowchart of another information reporting method according to an exemplary embodiment.

In an optional embodiment, referring to FIG. 4, which is a flowchart of another information reporting method according to the embodiment shown in FIG. 1, the method may further include the following steps.

In step 104, in response to determining that the state of any one of the pluralities of SIM cards has changed or is about to change, the updated SIM card information corresponding to the pluralities of SIM cards is reported to the network-side device.

In an example, if the state of any SIM card has been switched from the turn-off state to the turn-on state, the SIM card whose state has changed can report the updated SIM card information corresponding to the pluralities of SIM cards to the network-side device to which it is connected, the network-side device including but not limited to a base station and/or a core network. The network-side device may determine the number of SIM cards currently in the turn-on state according to the updated SIM card information.

In another example, if the state of any SIM card is about to be switched from the turn-on state to the turn-off state, for example, a shutdown instruction to turn off any SIM card is received, or a certain SIM card cannot be detected in the SIM card slot, then the SIM card switches to the idle state before switching to the turn-off state.

In the embodiments of the present disclosure, the SIM card whose state has changed needs to report the updated SIM card information corresponding to the pluralities of SIM cards to the network-side device to which it is connected before switching to the idle state. Optionally, the SIM card(s) whose state has changed may report the updated SIM card information corresponding to the pluralities of SIM cards to the network-side device through the first information unit in the first signaling. Optionally, the first signaling includes, but is not limited to, UEAssistanceInformation (terminal assistance information) signaling. The first information unit includes, but is not limited to, MUSIMInformation (multi-SIM card information) information unit in the UEAssistanceInformation signaling.

In the above embodiment, the multi-card terminal may notify the network-side device when the state of any SIM card changes or is about to change, so that the network-side device can synchronize the states of the pluralities of SIM cards, thus when it is determined that there is only one SIM card in the turn-on state subsequently, the sent second paging message for paging the SIM card in the turn-on state may not need to add the paging cause information, thereby saving signaling resources.

Figure 5:
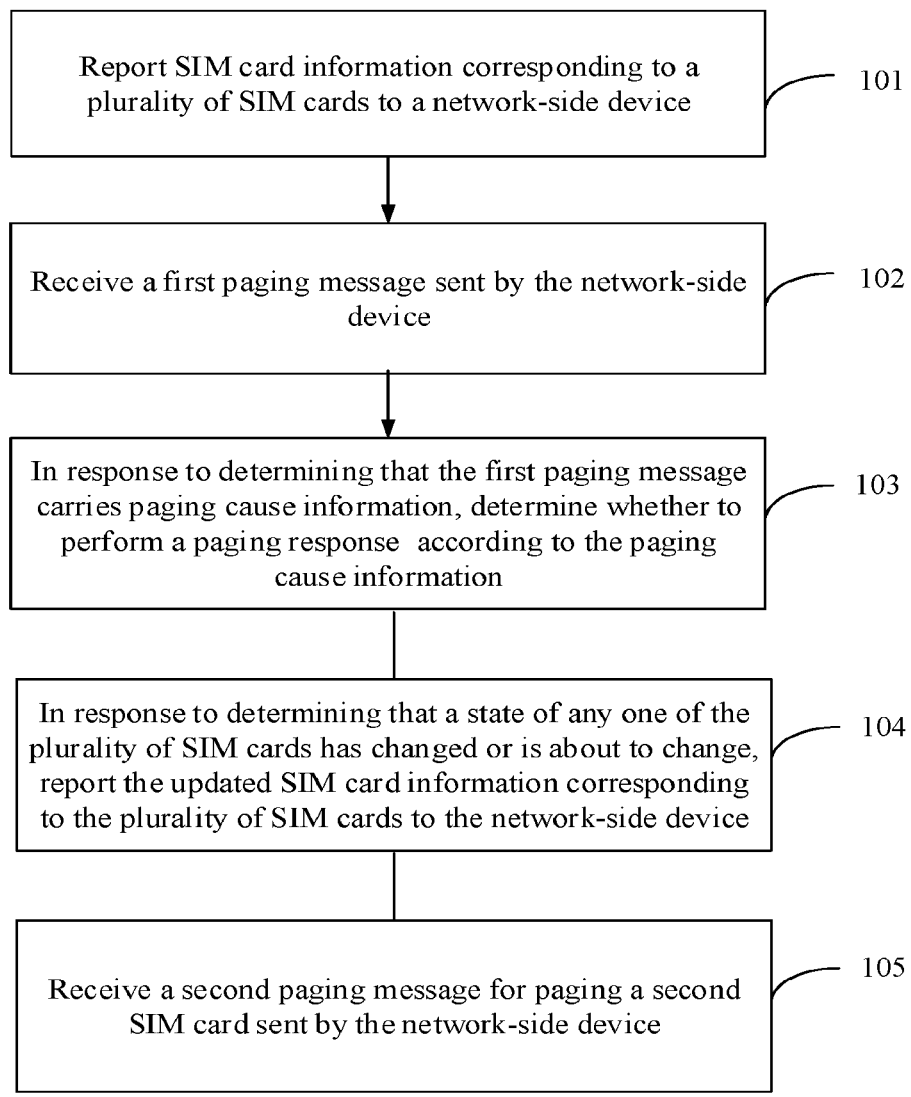
FIG. 5 is a schematic flowchart of another information reporting method according to an exemplary embodiment.

In an optional embodiment, referring to FIG. 5, which is a flowchart of another information reporting method according to the embodiment shown in FIG. 4, the method may further include the following steps.

In step 105, a second paging message for paging the second SIM card sent by the network-side device is received.

In the embodiments of the present disclosure, the second SIM card is the only SIM card in a turn-on state among the pluralities of SIM cards, the second paging message does not carry the paging cause information, and the network-side device is a network-side device to which the second SIM card is connected, and includes, but is not limited to, a base station and/or a core network.

In the case where the second SIM card is the only SIM card in the turn-on state among the pluralities of SIM cards, the terminal may be paged in the manner of a single-card terminal. Therefore, the second paging message may not carry the pager paging cause information, thereby saving the paging signaling resources. In the above embodiment, the second paging message sent by the network-side device for paging the second SIM card may be received, and in the case that the second SIM card is the only SIM card in the turn-on state among the pluralities of SIM cards, the second paging message may not carry the paging cause information, thus the availability is high, and signaling resources are saved.

Next, the information reporting solution provided by the present disclosure will be introduced from the network-side device. The network-side device may be a network-side device connected to any SIM card of the multi-card terminal, including but not limited to a base station and/or a core network.

Figure 6:
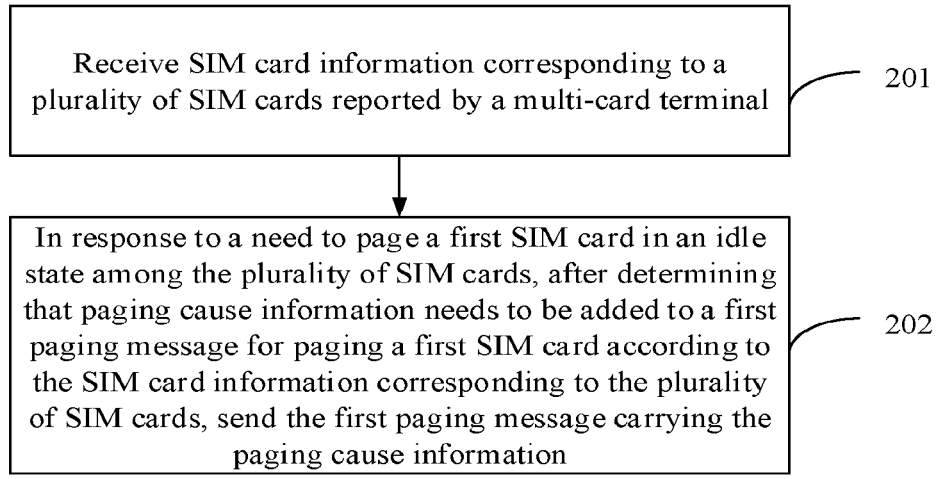
FIG. 6 is a schematic flowchart of another information reporting method according to an exemplary embodiment.

An embodiment of the present disclosure provides another information reporting method. Referring to FIG. 6, which is a flowchart of another information reporting method according to an embodiment, the method may be applied to a network-side device, and the method may include the following steps.

In step 201, SIM card information corresponding to pluralities of SIM cards reported by a multi-card terminal is received.

In the embodiments of the present disclosure, the SIM card information may include, but is not limited to, at least one of the following: the number of the pluralities of SIM cards, the identification information of each SIM card in the pluralities of SIM cards, whether each SIM card is in a turn-on state. The identification information of each SIM card may include, but is not limited to, actual identification information and/or temporary identification information of each SIM card. The multi-card terminal may report the SIM card information by the SIM card accessing the network-side device.

In step 202, in response to a need to page a first SIM card in an idle state among the pluralities of SIM cards, after determining that paging cause information needs to be added to a first paging message for paging the first SIM card according to the SIM card information corresponding to the pluralities of SIM cards, the first paging message carrying the paging cause information is sent.

In the embodiments of the present disclosure, if it is determined according to the SIM card information corresponding to the pluralities of SIM cards that the number of SIM cards in the turn-on state among the multi-card terminal is multiple, the network-side device may determine that the paging cause information needs to be added to the first paging message.

Further, the network-side device may add an information field for indicating the paging cause information in the first paging message, and inform the terminal side of the specific paging cause through a pre-agreed corresponding relationship between the bit value and the paging cause.

For example, the pre-agreed corresponding relationship includes that the bit value 001 corresponds to the telephone service, the bit value 010 corresponds to the short message service, etc. When the bit value corresponding to the information field added in the first paging message for indicating the paging cause information is 001, the multi-card terminal can determine that the paging cause is the telephone service after receiving the first paging message.

In the above embodiment, the network-side device can determine whether to add the paging cause information to the first paging message for paging the first SIM card in the idle state according to the SIM card information of the pluralities of SIM cards reported by the multi-card terminal, so that the multi-card terminal can determine whether to perform a paging response according to the paging cause information, so as to avoid affecting the service of the connected SIM card, and the availability is high.

Figure 7:
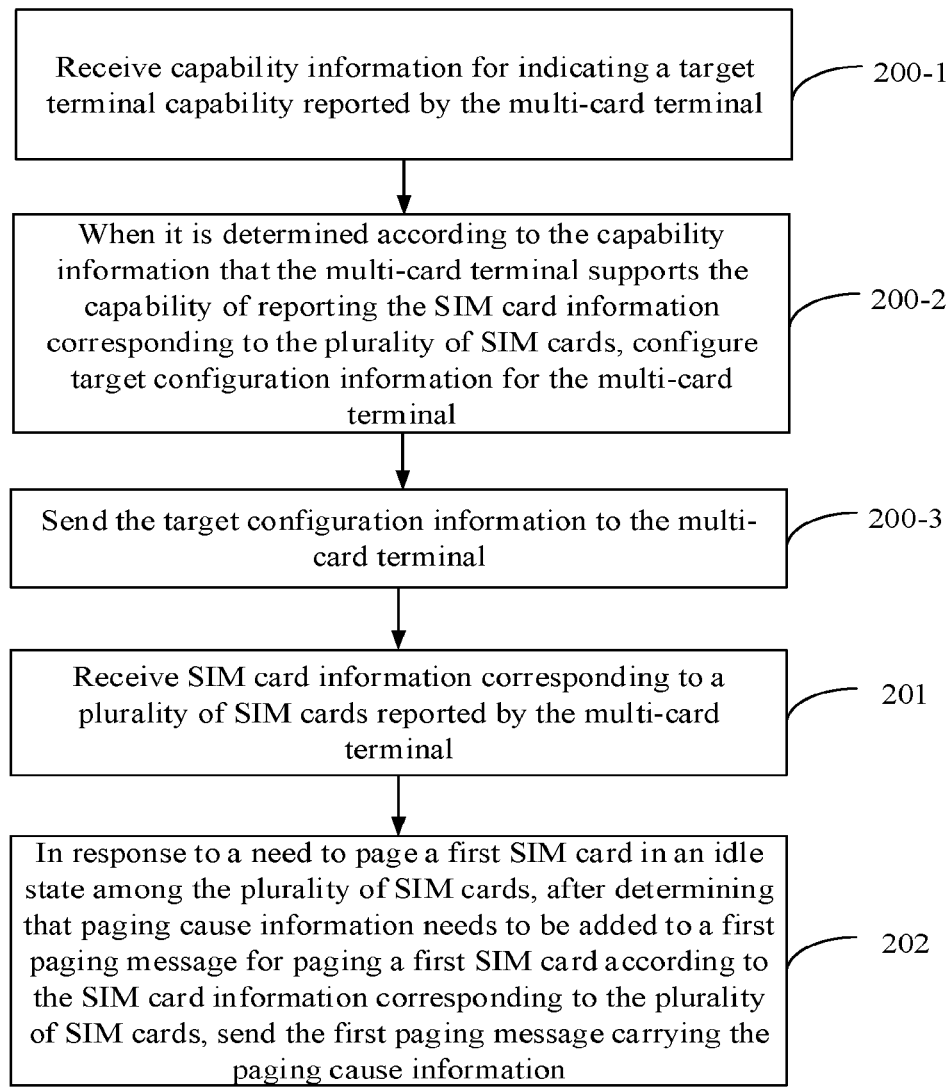
FIG. 7 is a schematic flowchart of another information reporting method according to an exemplary embodiment.

In an optional embodiment, referring to FIG. 7, which is a flowchart of another information reporting method according to the embodiment shown in FIG. 6, the method may further include the following steps.

In step 200-1, capability information for indicating a target terminal capability reported by the multi-card terminal is received.

The target terminal capability is used for indicating whether the multi-card terminal supports a capability of reporting the SIM card information corresponding to the pluralities of SIM cards.

In step 200-2, when it is determined according to the capability information that the multi-card terminal supports the capability of reporting the SIM card information corresponding to the pluralities of SIM cards, target configuration information is configured for the multi-card terminal.

The target configuration information is used for indicating configuration information when the multi-card terminal reports the SIM card information corresponding to the pluralities of SIM cards. The target configuration information is used for indicating at least one of the following: whether to allow the multi-card terminal to report the SIM card information corresponding to the pluralities of SIM cards; a SIM card identifier that allows reporting the SIM card information corresponding to the pluralities of SIM cards; a period duration of reporting the SIM card information corresponding to the pluralities of SIM cards; a reporting condition for reporting the SIM card information corresponding to the pluralities of SIM cards; a content of the reported SIM card information corresponding to the pluralities of SIM cards; a reporting format when reporting the SIM card information corresponding to the pluralities of SIM cards.

In step 200-3, the target configuration information is sent to the multi-card terminal.

Optionally, the target configuration information may be sent to the multi-card terminal through a third information unit of a third signaling. The third signaling may be an RRC signaling.

If the multi-card terminal and the network-side device communicate through the 4G network, the third signaling includes, but is not limited to, RRCConnectionReconfiguration (Radio Resource Control Connection Reconfiguration) signaling, and the third information unit may include, but is not limited to, OtherConfig (other configuration) information unit in the RRCConnectionReconfiguration signaling.

If the multi-card terminal and the network-side device communicate through the 5G network, the third signaling may include but not limited to RRCReconfiguration (Radio Resource Control Reconfiguration) signaling, and the third information unit may include but not limited to OtherConfig information unit in the RRCReconfiguration signaling.

In the above embodiment, the network-side device can configure the target configuration information when uploading the SIM card information for the multi-card terminal, so that the multi-card terminal can subsequently report the SIM card information based on the target configuration information, and the availability is high.

Figure 8:
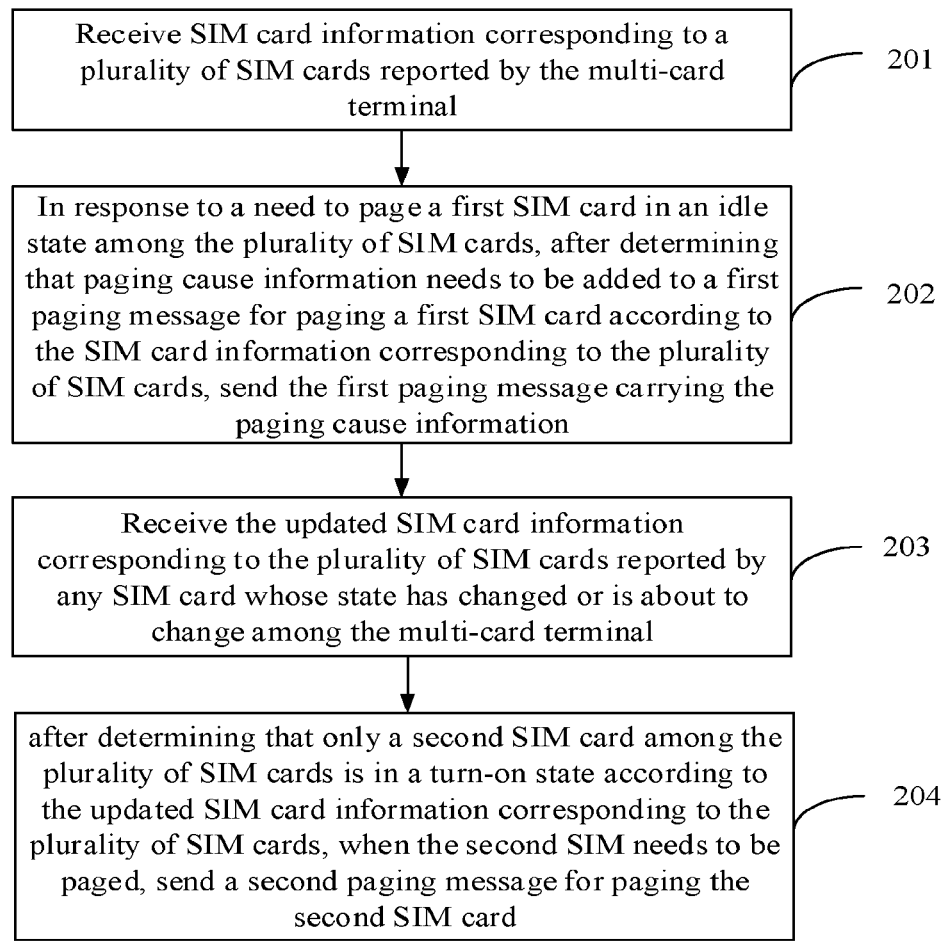
FIG. 8 is a schematic flowchart of another information reporting method according to an exemplary embodiment.

In an optional embodiment, referring to FIG. 8, which is a flowchart of another information reporting method according to the embodiment shown in FIG. 6, the method may further include the following steps.

In step 203, updated SIM card information corresponding to the pluralities of SIM cards reported by any SIM card whose state has changed or is about to change among the multi-card terminal is received.

In the embodiments of the present disclosure, the network-side device may determine the number of SIM cards currently in a turn-on state on the multi-card terminal according to the updated SIM card information corresponding to the pluralities of SIM cards.

In step 204, according to the updated SIM card information corresponding to the pluralities of SIM cards, after it is determined that only a second SIM card among the pluralities of SIM cards is in a turn-on state, when the second SIM needs to be paged, a second paging message for paging the second SIM card is sent.

The second paging message does not carry the paging cause information.

In the above embodiment, according to the updated SIM card information corresponding to the pluralities of SIM cards reported by the multi-card terminal, it is determined that only the second SIM card is currently in the turn-on state among the pluralities of SIM cards, then the second paging message may be sent to the second SIM card when paging the second SIM, where the second paging message may not carry the paging cause information, thereby saving signaling resources.

Figure 9:
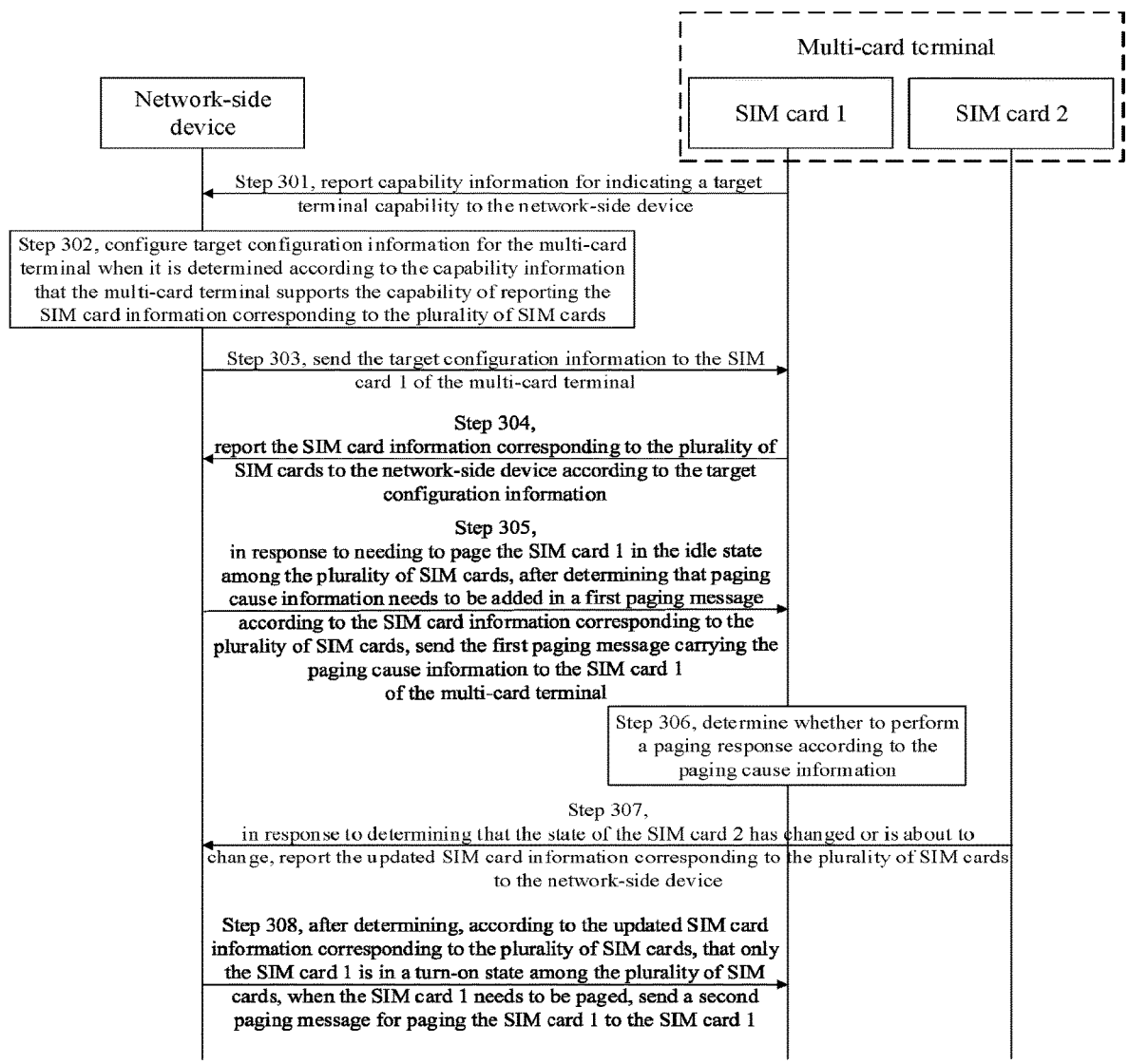
FIG. 9 is a schematic flowchart of another information reporting method according to an exemplary embodiment.

In an optional embodiment, reference is made to FIG. 9, which is a flowchart of an information reporting method according to an embodiment. FIG. 9 illustrates an example in which the multi-card terminal includes SIM card 1 and SIM card 2, and both SIM cards are connected to the same network-side device. In practical applications, the multi-card terminal may include more SIM cards, and different SIM cards may also be connected to different network-side devices, which is not limited in the present disclosure. The method may include the following steps.

In step 301, the SIM card 1 of the multi-card terminal reports capability information for indicating a target terminal capability to the network-side device.

The target terminal capability is used for indicating whether the multi-card terminal supports a capability of reporting the SIM card information corresponding to the pluralities of SIM cards.

In step 302, the network-side device configures target configuration information for the multi-card terminal when it is determined according to the capability information that the multi-card terminal supports the capability of reporting the SIM card information corresponding to the pluralities of SIM cards.

The target configuration information is used for indicating at least one of the following: whether to allow the multi-card terminal to report the SIM card information corresponding to the pluralities of SIM cards; a SIM card identifier that allows reporting the SIM card information corresponding to the pluralities of SIM cards; a period duration of reporting the SIM card information corresponding to the pluralities of SIM cards; a reporting condition for reporting the SIM card information corresponding to the pluralities of SIM cards; a content of the reported SIM card information corresponding to the pluralities of SIM cards; a reporting format when reporting the SIM card information corresponding to the pluralities of SIM cards.

In step 303, the network-side device sends the target configuration information to the SIM card 1.

In step 304, the SIM card 1 of the multi-card terminal reports the SIM card information corresponding to the pluralities of SIM cards to the network-side device according to the target configuration information.

In step 305, in response to needing to page the SIM card 1 in the idle state among the pluralities of SIM cards, after determining that paging cause information needs to be added in a first paging message according to the SIM card information corresponding to the pluralities of SIM cards, the network-side device sends the first paging message carrying the paging cause information to the SIM card 1.

In step 306, the SIM card 1 determines whether to perform a paging response according to the paging cause information.

In step 307, in response to determining that the state of the SIM card 2 has changed or is about to change, the multi-card terminal reports the updated SIM card information corresponding to the pluralities of SIM cards to the network-side device through the SIM card 2.

In step 308, after determining, according to the updated SIM card information corresponding to the pluralities of SIM cards, that only the SIM card 1 is in a turn-on state among the pluralities of SIM cards, when the SIM card 1 needs to be paged, the network-side device sends a second paging message for paging the SIM card 1 to the SIM card 1.

The second paging message does not carry the paging cause information.

In the above embodiment, the multi-card terminal can report the SIM card information of pluralities of SIM cards, so that the network-side device can add the paging cause information in the paging message. Further, the multi-card terminal can determine whether to perform a paging response according to the paging cause information, so as to avoid affecting the service of the connected SIM card, and the availability is high.

Corresponding to the foregoing application function implementation method embodiments, the present disclosure further provides embodiments of application function implementation apparatus.

Figure 10:
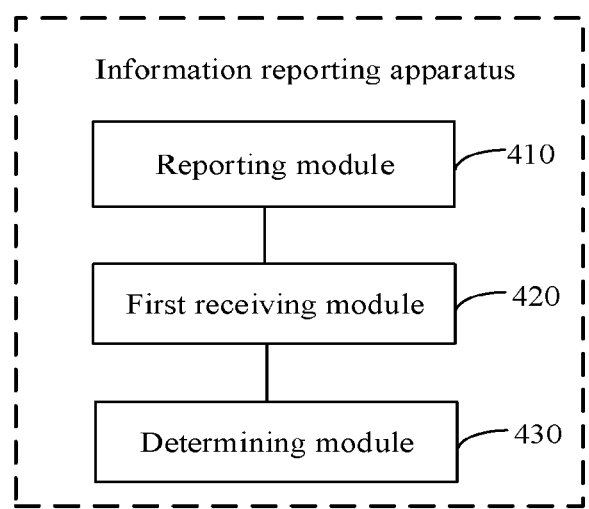
FIG. 10 is a block diagram of an information reporting apparatus according to an exemplary embodiment.

Referring to FIG. 10, which is a block diagram of an information reporting apparatus according to an exemplary embodiment, the apparatus is applied to a multi-card terminal, and includes:
  a reporting module 410, configured to report SIM card information corresponding to pluralities of SIM cards to a network-side device;
  a first receiving module 420, configured to receive a first paging message sent by the network-side device; where the first paging message is a paging message used for paging a first SIM card in an idle state among the pluralities of SIM cards;
  a determining module 430, configured to, in response to determining that the first paging message carries paging cause information, determine whether to perform a paging response according to the paging cause information.

Figure 11:
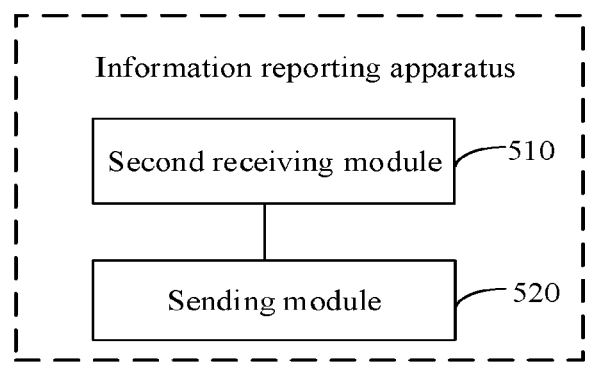
FIG. 11 is a block diagram of another information reporting apparatus according to an exemplary embodiment.

Referring to FIG. 11, which is a block diagram of another information reporting apparatus according to an exemplary embodiment, the apparatus is applied to a network-side device, and includes:
  a second receiving module 510, configured to receive SIM card information corresponding to pluralities of SIM cards reported by a multi-card terminal;
  a sending module 520, configured to, in response to a need of paging a first SIM card in an idle state among the pluralities of SIM cards, after determining that paging cause information needs to be added to a first paging message for paging the first SIM card according to the SIM card information corresponding to the pluralities of SIM cards, send the first paging message carrying the paging cause information.

For the apparatus embodiments, since they basically correspond to the method embodiments, reference may be made to partial descriptions of the method embodiments for related parts. The apparatus embodiments described above are only schematic, where the units described as separate components may or may not be physically separated, and the components shown as units may or may not be physical units, that is, they may be located in one place, or may be distributed over multiple network units. Some or all of the modules may be selected according to actual needs to achieve the purpose of the solution of the present disclosure. Those of ordinary skill in the art can understand and implement it without creative effort.

Correspondingly, the present disclosure also provides a computer-readable storage medium, where the storage medium stores a computer program, and the computer program is used to execute any one of the above-described information reporting methods for a multi-card terminal side.

Correspondingly, the present disclosure also provides a computer-readable storage medium, where the storage medium stores a computer program, and the computer program is used to execute any one of the above-described information reporting methods for a network-side device.

Correspondingly, the present disclosure also provides an information reporting apparatus, including:
  a processor; and
  a memory for storing instructions executable by the processor;
  where the processor is configured to execute the above-described information reporting method on the multi-card terminal side.

Figure 12:
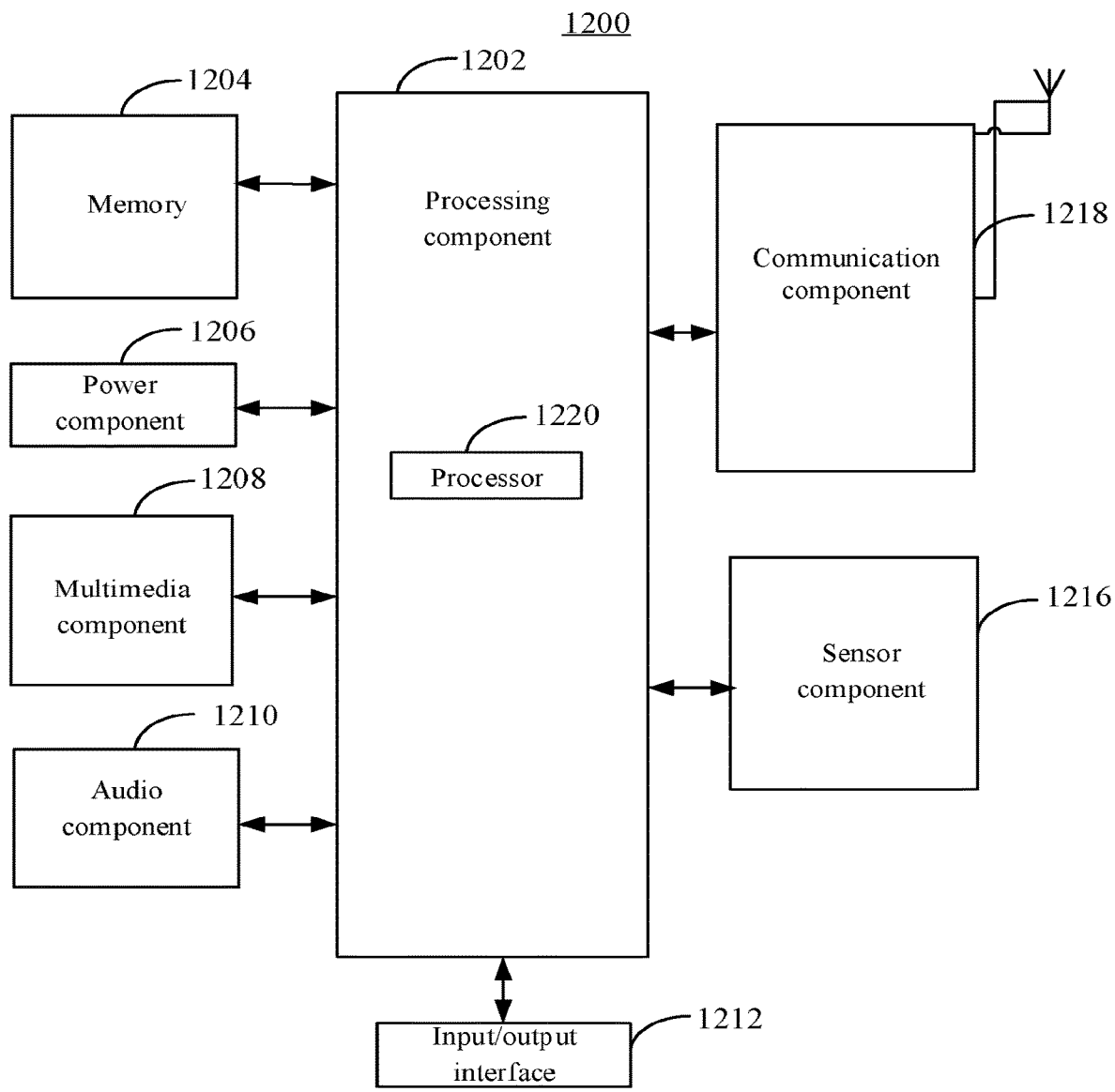
FIG. 12 is a schematic structural diagram of an information reporting apparatus according to an exemplary embodiment of the present disclosure.

FIG. 12 is a block diagram of an electronic device 1200 according to an exemplary embodiment. For example, the electronic device 1200 may be a multi-card terminal including pluralities of SIM cards, such as a mobile phone, a tablet computer, an e-book reader, a multimedia player, a wearable device, a vehicle-mounted terminal, an iPad, and a smart TV.

With reference to FIG. 12, the electronic device 1200 may include one or more of the following components: a processing component 1202, a memory 1204, a power component 1206, a multimedia component 1208, an audio component 1210, an input/output (I/O) interface 1212, a sensor component 1216, and an information reporting component 1218.

The processing component 1202 typically controls overall operations of the electronic device 1200, such as the operations associated with display, telephone calls, data information reporting, camera operations, and recording operations. The processing component 1202 may include one or more processors 1220 to execute instructions to complete all or part of the steps in the above-mentioned information reporting method. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202. For another instance, the processing component 1202 may read executable instructions from the memory to implement the steps of the information reporting method provided by the foregoing embodiments.

The memory 1204 is configured to store various types of data to support operation at the electronic device 1200. Examples of such data include instructions for any applications or methods operated on the electronic device 1200, contact data, phonebook data, messages, pictures, videos, etc. The memory 1204 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1206 provides power to various components of the electronic device 1200. The power component 1206 may include a power management system, one or more power sources, and other components associated with the generation, management, and distribution of power in the electronic device 1200.

The multimedia component 1208 includes a display screen providing an output interface between the electronic device 1200 and the user. In some embodiments, the multimedia component 1208 includes a front camera and/or a rear camera. The front camera and/or the rear camera may receive an external multimedia datum while the electronic device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the electronic device 1200 is in an operation mode, such as a call mode, a recording mode, and a voice recognition mode. The received audio signal may be further stored in memory 1204 or transmitted via the information reporting component 1218. In some embodiments, the audio component 1210 further includes a speaker to output audio signals.

The I/O interface 1212 provides an interface between the processing component 1202 and peripheral interface modules, which may be a keyboard, a click wheel, buttons, and the like. The buttons may include, but are not limited to, a home button, a volume button, a starting button, and a locking button.

The sensor component 1216 includes one or more sensors to provide various aspects of status assessment of the electronic device 1200. For example, the sensor component 1216 may detect an open/closed status of the electronic device 1200, relative positioning of components, e.g., the display and the keypad, of the electronic device 1200, a change in position of the electronic device 1200 or a component of the electronic device 1200, a presence or absence of user contact with the electronic device 1200, an orientation or an acceleration/deceleration of the electronic device 1200, and a change in temperature of the electronic device 1200. The sensor component 1216 may include a proximity sensor configured to detect the presence of nearby objects without any physical contact. The sensor component 1216 may also include a light sensor, such as a CMOS or CCD image sensor, for use in imaging applications. In some embodiments, the sensor component 1216 may also include an accelerometer sensor, a gyroscope sensor, a magnetic sensor, a pressure sensor, or a temperature sensor.

The information reporting component 1218 is configured to facilitate information reporting, wired or wirelessly, between the electronic device 1200 and other device. The electronic device 1200 may access a wireless network based on an information reporting standard, such as Wi-Fi, 2G, 3G, 4G, 5G or 6G or a combination thereof. In one exemplary embodiment, the information reporting component 1218 receives a broadcast signal or broadcast associated information from an external broadcast management system via a broadcast channel. In one exemplary embodiment, the information reporting component 1218 further includes a near field information reporting (near field communication, NFC) module to facilitate short-range information reporting. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described information reporting methods.

In exemplary embodiments, there is also provided a non-transitory machine-readable storage medium including instructions, such as the memory 1204 including instructions, the above instructions may be executed by the processor 1220 in the electronic device 1200 for performing the above-described wireless charging methods. For example, the non-transitory computer-readable storage medium may be a ROM, a random access memory (RAM), a CD-ROM, a magnetic tape, a floppy disc, an optical data storage device, and the like.

Correspondingly, the present disclosure also provides an information reporting device, including:
  a processor; and
  a memory for storing instructions executable by the processor;
  where the processor is configured to execute the above-described information reporting method on the network-side device.

Figure 13:
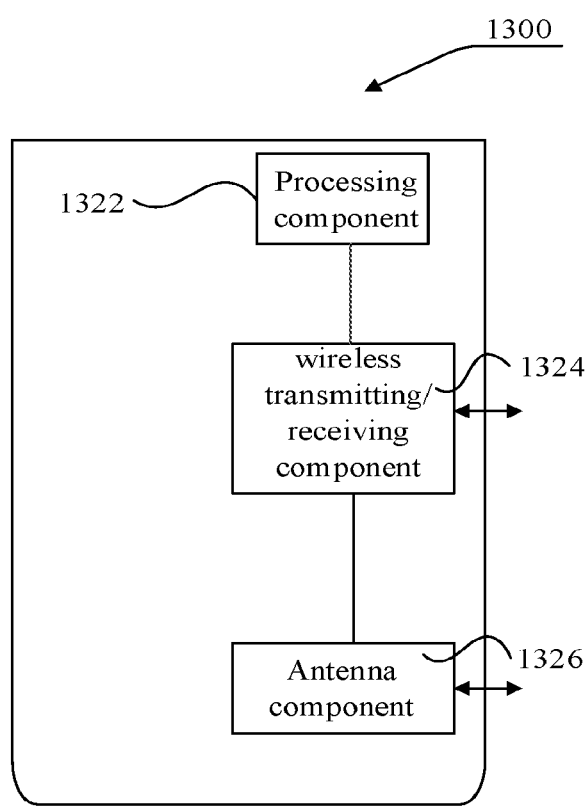
FIG. 13 is a schematic structural diagram of another information reporting apparatus according to an exemplary embodiment of the present disclosure.

As shown in FIG. 13, which is a schematic structural diagram of another information reporting apparatus 1300 according to an exemplary embodiment, the apparatus 1300 may be provided as a network-side device, including but not limited to a base station and/or a core network. With reference to FIG. 13, the apparatus 1300 includes a processing component 1322, a wireless transmitting/receiving component 1324, an antenna component 1326, and a signal processing portion specific to a wireless interface, and the processing component 1322 may further include one or more processors.

One of the processors in the processing component 1322 may be configured to execute any one of the information reporting methods described above for the network-side device.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An information reporting method, wherein the method is applied to a multi-card terminal, and the method comprises:
    reporting SIM card information corresponding to pluralities of SIM cards to a network-side device;
    receiving a first paging message sent by the network-side device; wherein the first paging message is a paging message for paging a first SIM card in an idle state among the pluralities of SIM cards; and
    in response to determining that the first paging message carries paging cause information, determining whether to perform a paging response according to the paging cause information;
    wherein, the method further comprises:
    in response to determining that a state of any one of the pluralities of SIM cards has changed or is about to change, reporting updated SIM card information corresponding to the pluralities of SIM cards to the network-side device;
    receiving a second paging message for paging a second SIM card sent by the network-side device; wherein the second SIM card is an only SIM card in a turn-on state among the pluralities of SIM cards, and the second paging message does not carry the paging cause information.

2. The method according to claim 1, wherein the reporting the SIM card information corresponding to the pluralities of SIM cards to the network-side device comprises:
    reporting the SIM card information corresponding to the pluralities of SIM cards to the network-side device through at least one of the pluralities of SIM cards.

3. The method according to claim 1, wherein the reporting the SIM card information corresponding to the pluralities of SIM cards to the network-side device comprises:
    reporting the SIM card information corresponding to the pluralities of SIM cards to the network-side device through a first information unit in a first signaling.

4. The method according to claim 1, wherein before reporting the SIM card information corresponding to the pluralities of SIM cards to the network-side device, the method further comprises:
    reporting capability information for indicating a target terminal capability to the network-side device; wherein the target terminal capability is used for indicating whether the multi-card terminal supports a capability of reporting the SIM card information corresponding to the pluralities of SIM cards.

5. The method according to claim 4, wherein the reporting the capability information for indicating the target terminal capability to the network-side device comprises:
    reporting the capability information for indicating the target terminal capability to the network-side device through a second information unit of a second signaling.

6. The method according to claim 4, further comprising:
    receiving target configuration information sent by the network-side device; wherein the target configuration information is used for indicating configuration information when the multi-card terminal reports the SIM card information corresponding to the pluralities of SIM cards; and
    the reporting the SIM card information corresponding to the pluralities of SIM cards to the network-side device comprises:
    reporting the SIM card information corresponding to the pluralities of SIM cards to the network-side device based on the target configuration information.

7. The method according to claim 6, wherein the target configuration information is used for indicating at least one of:
    whether to allow the multi-card terminal to report the SIM card information corresponding to the pluralities of SIM cards;
    a SIM card identifier that allows reporting the SIM card information corresponding to the pluralities of SIM cards;
    a period duration of reporting the SIM card information corresponding to the pluralities of SIM cards;
    a reporting condition for reporting the SIM card information corresponding to the pluralities of SIM cards;
    a content of the reported SIM card information corresponding to the pluralities of SIM cards; or
    a reporting format when reporting the SIM card information corresponding to the pluralities of SIM cards.

8. The method according to claim 1, wherein the reporting the updated SIM card information corresponding to the pluralities of SIM cards to the network-side device in response to determining that the state of any one of the pluralities of SIM cards has changed or is about to change, comprises:
    in response to determining that the state of any one of the SIM cards is switched from a turn-off state to a turn-on state, reporting the updated SIM card information corresponding to the pluralities of SIM cards to the network-side device.

9. The method according to claim 1, wherein the reporting the updated SIM card information corresponding to the pluralities of SIM cards to the network-side device in response to determining that the state of any one of the pluralities of SIM cards has changed or is about to change, comprises:
    in response to determining that the state of any one of the SIM cards is about to be switched from a turn-on state to a turn-off state, before the any one of the SIM cards is switched to the idle state, reporting the updated SIM card information corresponding to the pluralities of SIM cards to the network-side device.

10. The method according to claim 1, wherein the reporting the updated SIM card information corresponding to the pluralities of SIM cards to the network-side device comprises:

reporting the updated SIM card information corresponding to the pluralities of SIM cards to the network-side device through a first information unit in a first signaling.

11. An information reporting apparatus, comprising:
a processor; and
a memory for storing instructions executable by the processor;
wherein the processor is configured to execute the information reporting method according to claim 1.

12. An information reporting method, wherein the method is applied to a network-side device, and the method comprises:
receiving SIM card information corresponding to pluralities of SIM cards reported by a multi-card terminal; and
in response to a need to page a first SIM card in an idle state among the pluralities of SIM cards, after determining that paging cause information needs to be added to a first paging message for paging the first SIM card according to the SIM card information corresponding to the pluralities of SIM cards, sending the first paging message carrying the paging cause information;
wherein the method further comprises:
receiving updated SIM card information corresponding to the pluralities of SIM cards reported by any SIM card whose state has changed or is about to change among the multi-card terminal:
according to the updated SIM card information corresponding to the pluralities of SIM cards, after determining that only a second SIM card is in a turn-on state among the pluralities of SIM cards, when the second SIM card needs to be paged, sending a second paging message for paging the second SIM card; wherein the second paging message does not carry the paging cause information.

13. The method according to claim 12, wherein the determining that the paging cause information needs to be added to the first paging message for paging the first SIM card according to the SIM card information corresponding to the pluralities of SIM cards, comprises:
in response to determining that a number of SIM cards in a turn-on state in the multi-card terminal is multiple according to the SIM card information corresponding to the pluralities of SIM cards, determining that the paging cause information needs to be added to the first paging message.

14. The method according to claim 12, further comprising:
receiving capability information for indicating a target terminal capability reported by the multi-card terminal; wherein the target terminal capability is used for indicating whether the multi-card terminal supports a capability of reporting the SIM card information corresponding to the pluralities of SIM cards;
in response to determining that the multi-card terminal supports the capability of reporting the SIM card information corresponding to the pluralities of SIM cards according to the capability information, configuring target configuration information for the multi-card terminal; wherein the target configuration information is used for indicating configuration information when the multi-card terminal reports the SIM card information corresponding to the pluralities of SIM cards;
sending the target configuration information to the multi-card terminal.

15. The method according to claim 14, wherein the sending the target configuration information to the multi-card terminal comprises:
sending the target configuration information to the multi-card terminal through a third information unit of a third signaling.

16. The method according to claim 14, wherein the target configuration information is used for indicating at least one of:
whether to allow the multi-card terminal to report the SIM card information corresponding to the pluralities of SIM cards;
a SIM card identifier that allows reporting the SIM card information corresponding to the pluralities of SIM cards;
a period duration of reporting the SIM card information corresponding to the pluralities of SIM cards;
a reporting condition for reporting the SIM card information corresponding to the pluralities of SIM cards;
a content of the reported SIM card information corresponding to the pluralities of SIM cards; or
a reporting format when reporting the SIM card information corresponding to the pluralities of SIM cards.

17. An information reporting apparatus, comprising:
a processor; and
a memory for storing instructions executable by the processor;
wherein the processor is configured to execute the information reporting method according to claim 12.

* * * * *